(12) United States Patent
Nakajima

(10) Patent No.: US 7,773,832 B2
(45) Date of Patent: Aug. 10, 2010

(54) IMAGE OUTPUTTING APPARATUS, IMAGE OUTPUTTING METHOD AND PROGRAM

(75) Inventor: Nobuyoshi Nakajima, Kanagawa (JP)

(73) Assignee: FujiFilm Corporation, Tokyo (JP)

( * ) Notice: Subject to any disclaimer, the term of this patent is extended or adjusted under 35 U.S.C. 154(b) by 1200 days.

(21) Appl. No.: 11/362,731

(22) Filed: Feb. 28, 2006

(65) Prior Publication Data
US 2006/0203012 A1 Sep. 14, 2006

(30) Foreign Application Priority Data
Feb. 28, 2005 (JP) .............................. 2005-053061

(51) Int. Cl.
*G06K 9/54* (2006.01)
*G09G 5/00* (2006.01)
(52) U.S. Cl. ...................... 382/305; 345/629
(58) Field of Classification Search ................ 382/278, 382/305, 312; 355/38; 345/581, 723, 428, 345/629; 348/231.99; 715/838
See application file for complete search history.

(56) References Cited

U.S. PATENT DOCUMENTS

| | | | | |
|---|---|---|---|---|
| 5,369,463 | A * | 11/1994 | Terashita et al. ............... | 355/38 |
| 6,504,571 | B1 * | 1/2003 | Narayanaswami et al. ...................... | 348/231.99 |
| 7,158,689 | B2 * | 1/2007 | Valleriano et al. ............. | 382/278 |
| 7,307,636 | B2 * | 12/2007 | Matraszek et al. ............ | 345/581 |
| 7,398,479 | B2 * | 7/2008 | Hooper et al. ............... | 715/838 |
| 2002/0063731 | A1 * | 5/2002 | Sakamoto et al. ............ | 345/723 |

FOREIGN PATENT DOCUMENTS

JP 10-126731 A 5/1998

* cited by examiner

*Primary Examiner*—Kanji Patel
(74) *Attorney, Agent, or Firm*—Birch, Stewart, Kolasch & Birch, LLP

(57) ABSTRACT

There is provided an image outputting apparatus for generating an album by selecting adequate images for an appreciator out of a plurality of images. The image outputting apparatus has an final image storing section for storing a plurality of final images, an image-capturing-time storing section for storing image capturing time when each of the plurality of final images stored in the final image storing section was captured, an output time getting section for getting output time when the plurality of final images stored in the final image storing section is required to be outputted, a time range setting section for setting a wider time range when a difference between the output time obtained by the output time getting section and the image capturing time of the final image stored in the final image storing section is longer, an image selecting section for selecting a plurality of final images captured within a preset time range among the plurality of final images stored in the final image storing section and an image output controlling section for outputting the plurality of final images selected by the image selecting section at different positions within one and same output area.

14 Claims, 9 Drawing Sheets

242

| VIEWR | PERSON OF INTEREST | DEGREE OF INTEREST |
|---|---|---|
| #501 | #511 | 10 |
| #501 | #512 | 8 |
| #502 | #501 | 7 |
| ⋮ | ⋮ | ⋮ |

| SUBJECT ID | SUBJECT IMAGE |
|---|---|
| #601 | SUBJECT IMAGE DATA 601 |
| #602 | SUBJECT IMAGE DATA 602 |
| ⋮ | ⋮ |

| SUBJECT ID | SUBJECT VOICE |
|---|---|
| #601 | SUBJECT VOICE DATA 601 |
| #602 | SUBJECT VOICE DATA 602 |
| ⋮ | ⋮ |

FIG. 7

IMAGE OUTPUTTING APPARATUS, IMAGE OUTPUTTING METHOD AND PROGRAM

CROSS REFERENCE TO RELATED APPLICATION

The present application claims priority from a Japanese Patent Applications Nos. JP 2005-053061 filed on Feb. 28, 2005, the contents of which are incorporated herein by reference.

BACKGROUND OF THE INVENTION

1. Field of the Invention

The present invention relates to an image outputting apparatus, an image outputting method and a program. More specifically, the invention relates to an image outputting apparatus and an image outputting method for outputting images and a program for the image outputting apparatus.

2. Related Art

There has been known a technology for generating an album laid out so as to dispose a map of traveling spot at the center of a screen and so that a user can see a relationship between the map and images disposed around the map by connecting the images and image capturing positions on the map by lines based on tag information such as information on position, image capturing time and others tagged to data of images captured at the traveling spots, as disclosed in Japanese Patent Application Publication No. 1998-126731.

However, the above Japanese Patent Application Publication No. 1998-126731 has not disclosed a technology for selecting adequate images when, for example, an appreciator in a matured age wants to generate an album by using images captured when the appreciator traveled around the world through his adolescence. In such a case, it is desirable to generate the album by picking up images captured in various periods and in various countries, not an album per each tourist spot and per traveling period. Meanwhile, it is desirable for the appreciator to be able to readily appreciate the album without cumbersome works such as image editing operations.

Accordingly, it is an object of the invention to provide an image outputting apparatus, an image outputting method and a program that are capable of solving the above-mentioned problems. This object may be achieved through the combination of features described in independent claims of the invention. Dependent claims thereof specify preferable embodiments of the invention.

SUMMARY OF THE INVENTION

A first aspect of the invention provides an image outputting apparatus. The image outputting apparatus has an final image storing section for storing a plurality of final images, an image-capturing-time storing section for storing image capturing time when each of the plurality of final images stored in the final image storing section was captured, an image selecting section for selecting a plurality of final images captured within a preset time range among the plurality of final images stored in the final image storing section, and an image output controlling section for outputting the plurality of final images selected by the image selecting section at different positions within one and same output area.

The image outputting apparatus may further include an output time getting section for getting output time when the plurality of final images stored in the final image storing section is required to be outputted and a time range setting section for setting a wider time range when a difference between the output time obtained by the output time getting section and the image capturing time of the final image stored in the final image storing section is longer, and the image selecting section may select the plurality of final images captured within the time range set by the time range setting section.

The image output controlling section may output the plurality of final images selected by the image selecting section by disposing corresponding to order of the image capturing time of the plurality of final images. The image outputting apparatus may further include an image-capturing-position storing section for storing image capturing position where each of the plurality of final images stored in the final image storing section was captured, and the image selecting section may select a plurality of final images captured within a positional range set in advance within a time range set in advance among the plurality of final images stored in the final image storing section.

The image outputting apparatus may further include an output position getting section for getting output position which is the position where an image outputting device for outputting the plurality of final images under control of the image output controlling section is installed and a positional range setting section for setting a wider positional range when a difference of position between the output position obtained by the output position getting section and the image capturing position of the final image stored in the final image storing section is larger, and the image selecting section may select a plurality of final images captured within the positional range set by the positional range setting section. The image output controlling section may output the plurality of final images selected by the image selecting section by disposing corresponding to image capturing position of the plurality of final images.

The image outputting apparatus may further include a number-of-people detecting section for detecting a number of people contained in each of the plurality of final images stored in the final image storing section, and the image output controlling section may output a final image containing a largest number of people detected by the number-of-people detecting section at the center among the plurality of final images selected by the image selecting section.

A second aspect of the invention provides an image outputting method. The image outputting method has a final image storing step of storing a plurality of final images, an image-capturing-time storing step of storing image capturing time when each of the plurality of final images stored in the final image storing step was captured, an image selecting step of selecting a plurality of final images captured within a preset time range among the plurality of final images stored in the final image storing step, and an image output controlling step of outputting the plurality of final images selected in the is storing step at different positions within one and same output area.

A third aspect of the invention provides a program for use in an image outputting apparatus for outputting images. The program operates the image outputting apparatus as an final image storing section for storing a plurality of final images, an image-capturing-time storing section for storing image capturing time when each of the plurality of final images stored in the final image storing section was captured, an image selecting section for selecting a plurality of final images captured within a preset time range among the plurality of final images stored in the final image storing section and an image output controlling section for outputting the plurality of final images selected by the image selecting section at different positions within one and same output area.

A fourth aspect of the invention provides an image outputting apparatus. The image outputting apparatus has a final image storing section for storing a plurality of final images, an image-capturing-position storing section for storing image capturing position where each of the plurality of final images stored in the final image storing section was captured, an image selecting section for selecting a plurality of final images captured within a preset positional range among the plurality of final images stored in the final image storing section, and an image output controlling section for outputting the plurality of final images selected by the image selecting section at different positions within one and same output area.

A fifth aspect of the invention provides an image outputting method. The image outputting method has a final image storing step of storing a plurality of final images, an image-capturing-position storing step of storing image capturing position where each of the plurality of final images stored in the final image storing step was captured, an image selecting step of selecting a plurality of final images captured within a preset positional range among the plurality of final images stored in the final image storing step, and an image output controlling step of outputting the plurality of final images selected in the image selecting step at different positions within one and same output area.

A sixth aspect of the invention provides a program for an image outputting apparatus for outputting images. The program operates the image outputting apparatus as a final image storing section for storing a plurality of final images, an image-capturing-position storing section for storing image capturing position where each of the plurality of final images stored in the final image storing section was captured, an image selecting section for selecting a plurality of final images captured within a preset positional range among the plurality of final images stored in the final image storing section and an image output controlling section for outputting the plurality of final images selected by the image selecting section at different positions within one and same output area.

It is noted that the summary of the invention described above does not necessarily describe all necessary features of the invention. The invention may also be a sub-combination of the features described above.

Thus, the invention enables the appreciator to generate an album by selecting images adequate for the appreciator.

BRIEF DESCRIPTION OF THE DRAWINGS

FIG. 5 is a table showing data stored in a person-of-interest storing section in a data format.

FIG. 6 is a table showing data stored in a subject image storing section in a table format.

FIG. 7 is a table showing data stored in a subject voice storing section in a table format.

DETAILED DESCRIPTION OF THE INVENTION

The invention will now be described based on preferred embodiments, which do not intend to limit the scope of the invention, but exemplify the invention. All of the features and the combinations thereof described in the embodiments are not necessarily essential to the invention.

Figure 1:
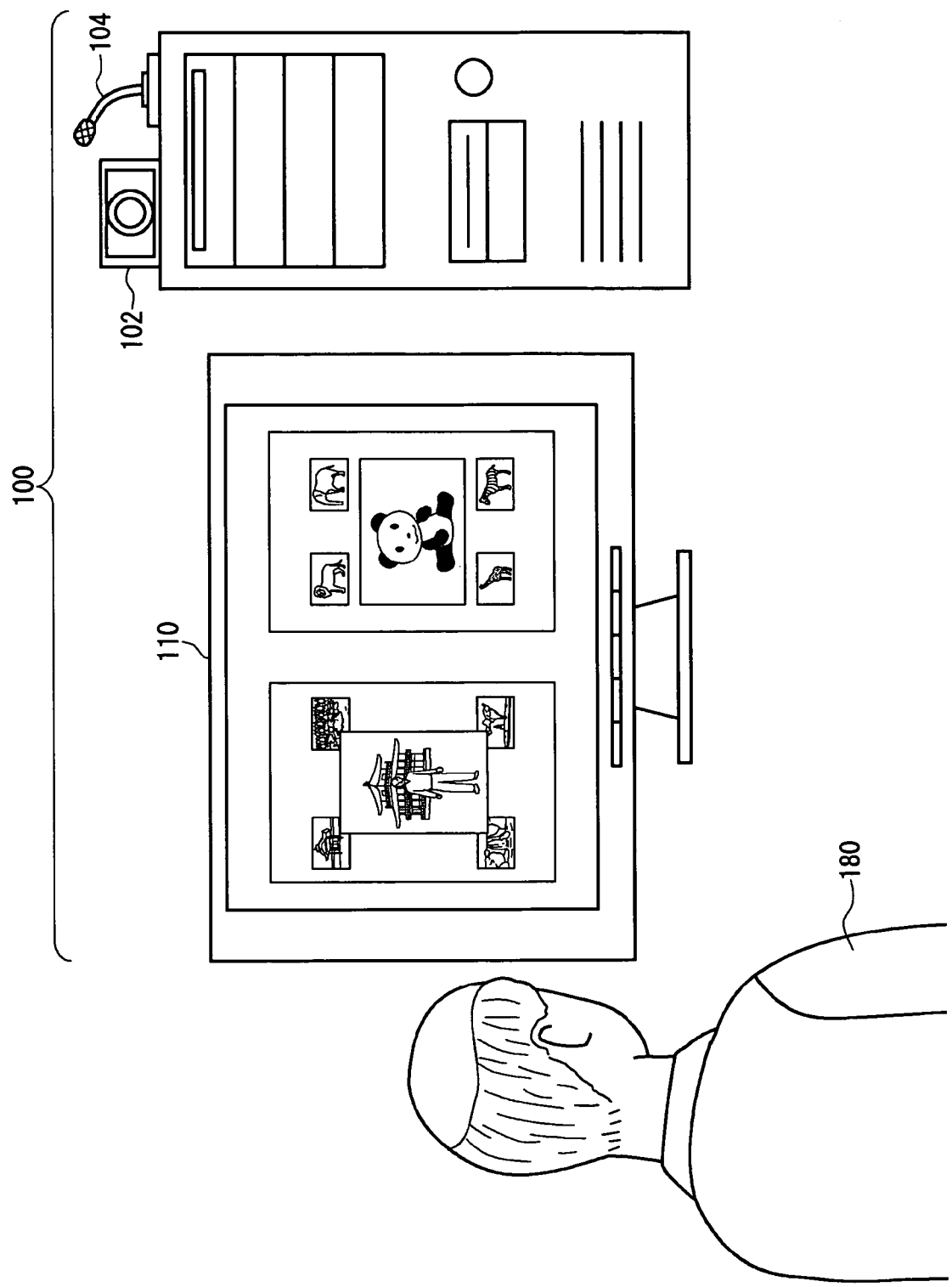
FIG. 1 is a drawing showing an environment for using an image outputting apparatus.

FIG. 1 is a drawing showing an environment for using an image outputting apparatus 100 according to one embodiment of the invention. As one example of the image outputting apparatus 100, FIG. 1 shows a personal computer for displaying a plurality of final images captured by a user 180 on an image output device 110 such as a display. The image outputting apparatus 100 stores a plurality of final images captured by the user 180 in Kyoto Prefecture and in the whole area of South Korea for example by using a digital still camera, together with image capturing places and image capturing times where and when the images were captured. Then the user 180 who lives in Tokyo selects an image captured at the Kinkaku-ji (the Temple of the Golden Pavilion) as a typical image, the image outputting apparatus 100 generates and displays an album by selecting the images captured in the city of Kyoto around the Kinkaku-ji. When the user 180 selects an image captured in Seoul, South Korea as a typical image of an album, the image outputting apparatus 100 generates and displays the album by selecting the images captured in the whole area of South Korea. Thereby, the user 180 can appreciate the album in which the typical images of the whole area of distant South Korea are stored. Meanwhile, when the user 180 wants to appreciate the album of the images captured in the city of Kyoto, the image outputting apparatus 100 will not select images such as those of Tokyo where the user 180 lives by which the user 180 would feel a sense of incompatibility. Therefore, the user 180 can enjoy appreciating the images.

Still more, when the user 180 instructs the image outputting apparatus 100 to display images captured 10 days ago for example, the image outputting apparatus 100 displays the images captured between 11 and 9 days ago. Still more, when the user 180 instructs the image outputting apparatus 100 to display images captured 10 years ago, the image outputting apparatus 100 displays the images captured between 11 and 9 years ago. When the user 180 wants to see the images of 10 days ago, the image outputting apparatus 100 will not select images such as those captured on the preceding day for example, by which the user 180 would feel a sense of incompatibility, but will select images captured in an adequate time range. Still more, when the user 180 wants to see the images captured 10 years ago, the user 180 will feel specifically no sense of incompatibility even when images captured during one year before and after that year. Then, the user 180 can rather miss the past memories of the long time ago while appreciating the images in which the user himself is there as the image outputting apparatus 100 selects and displays the images in which the user 180 is taken among the images captured during one year before and after that year.

Still more, the image outputting apparatus 100 identifies the user 180 based on features of the face of the user 180 captured by a image capturing section 102 provided in the image outputting apparatus 100 and/or on features of voice of the user 180 recorded by a recording section 104 provided in the image outputting apparatus 100. Then, the image outputting apparatus 100 judges a person who has been registered in the image outputting apparatus 100 and whom the user 180 holds interest in and displays an image in which that person is imaged at the center of a display area of the image outputting apparatus 100 in a size lager than other images while disposing the other images around that image.

Beside that, an image in which the user 180 is imaged may be disposed at the center of the display area of the image outputting apparatus 100. The image outputting apparatus 100 cuts out an image area in which the person whom the user 180 holds interest in or the user 180 himself is imaged and displays by enlarging that image area. Accordingly, the image outputting apparatus 100 can provide the user 180 with an album laid out so that an image important for the user 180 is disposed at the adequate position.

It is noted that the image outputting apparatus 100 may be an apparatus that displays a plurality of images on a screen such as an electronic photo-stand and HDTV, beside a personal computer. Still more, the image outputting apparatus 100 may be a digital still camera, a portable phone equipped with a camera, PDA and the like that displays images on a screen while capturing images. Further, the image outputting apparatus 100 may be an apparatus that prints and outputs images such as a printer.

The image outputting apparatus 100 described above can provide the user 180 with images by which the individual user 180 can enjoy appreciating out of the album storing the plurality of images. The user 180 can also appreciate the album storing the images desirable for the user 180 without carrying out such complicated works of editing the images and of determining the layout.

Figure 2:
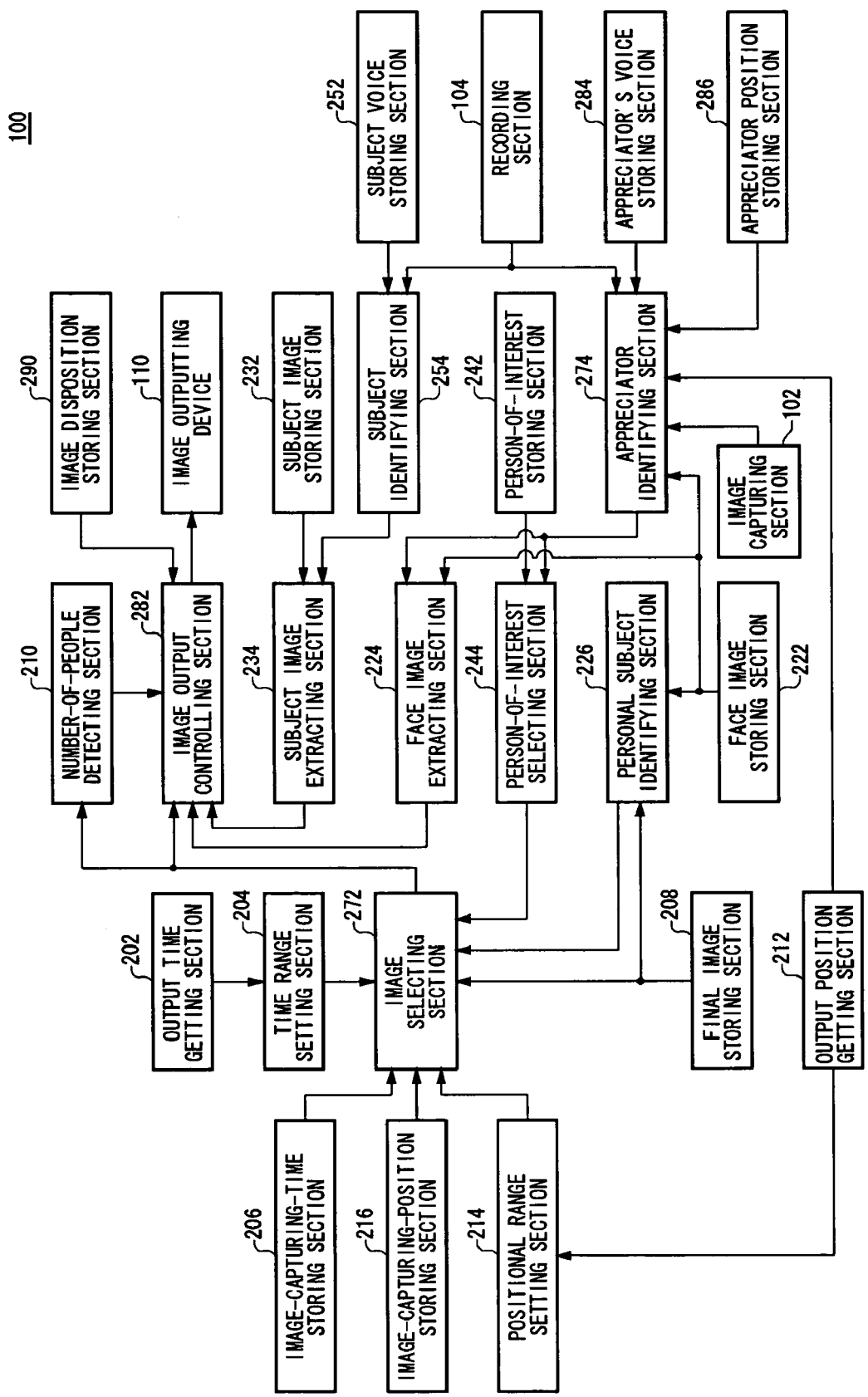
FIG. 2 is a block diagram showing a block configuration of the image outputting apparatus.

FIG. 2 is a block diagram showing one exemplary block configuration of the image outputting apparatus 100. The image outputting apparatus 100 has an output time getting section 202, an image-capturing-time storing section 206, an image-capturing-position storing section 216, a time range setting section 204, a recording section 104, a positional range setting section 214, an output position getting section 212, an final image storing section 208, an image selecting section 272, an image output controlling section 282, an image outputting device 110, an subject image extracting section 234, an subject image storing section 232, an subject identifying section 254, an subject voice storing section 252, a face image extracting section 224, a person-of-interest storing section 242, a person-of-interest selecting section 244, a personal subject identifying section 226, a face image storing section 222, an appreciator identifying section 274, an image capturing section 102, an appreciator position storing section 286, an appreciator's voice storing section 284, an appreciator's voice storing section 284, a recording section 104 a number-of-people detecting section 210 and an image disposition storing section 290.

The final image storing section 208 stores a plurality of final images. The image-capturing-time storing section 206 stores image capturing time when the plurality of images stored in the final image storing section 208 was captured. Specifically, the final image storing section 208 stores the plurality of final images by correlating with image IDs for identifying the plurality of final images. Then, the image-capturing-time storing section 206 stores the image capturing time when the final image identified by the image ID was captured by correlating with the image ID. It is noted that the final image storing section 208 may store the final image by extracting the image capturing time tagged to the final image as tag information. Beside that, the image capturing time stored in the image-capturing-time storing section 206 may be the very image capturing time tagged to the final image as tag information.

The output time getting section 202 obtains output time when the plurality of final images stored in the final image storing section 208 is required to be outputted. When a difference between the output time obtained by the output time getting section 202 and the image capturing time of the final image stored in the final image storing section 208 is long, the time range setting section 204 sets a wider time range.

The image selecting section 272 selects a plurality of final images captured within the preset time range among the plurality of final images stored in the final image storing section 208. More specifically, the image selecting section 272 selects the plurality of final images captured within the time range set by the time range setting section 204.

The image outputting device 110 outputs the plurality of final images stored in the final image storing section 208. It is noted that the image outputting device 110 may be a display device such as a liquid crystal display for displaying a plurality of images or may be a printing device for outputting and printing images. The image output controlling section 282 outputs the plurality of final images selected by the image selecting section 272 simultaneously in difference areas of the image outputting device 110. Specifically, the image output controlling section 282 outputs the plurality of final images selected by the image selecting section 272 at different positions within one and same output area. More specifically, the image output controlling section 282 outputs the plurality of final images selected by the image selecting section 272 at different positions within one and same output area of the image outputting device 110 so as to enable the appreciator to appreciate them simultaneously. For example, the image output controlling section 282 outputs the plurality of final images selected by the image selecting section 272 by arranging at different positions within one and same output area. More specifically, when the image outputting device 110 is a display device, the image output controlling section 282 causes the image outputting device 110 to display the images at different positions within one and same display area of the image outputting device 110. When the image outputting device 110 is a printing device, the image output controlling section 282 causes the printing device to output and print the plurality of final images selected by the image selecting section 272 at different positions of one and same printing medium to be printed by the printing device. It is noted that one and same output area may be an area that can be simultaneously appreciated by the appreciator. For example, one and same output area may be a display area which can be displayed on the display device at a time. The output area may be a printing medium to be printed by the printing device. In this case, one and same output area may be one printing medium or a may be a spread page of a book such as an album containing a plurality of printing media.

More specifically, the image output controlling section 282 outputs the plurality of final images selected by the image selecting section 272 by disposing corresponding to order of image capturing time of the plurality of final images. For example, the image output controlling section 282 may dispose the final image whose image capturing time is older at the upper and/or left part on the screen displayed by the image outputting device 110 or on the printing medium to be outputted.

The image disposition storing section 290 stores layout data indicating the disposition of the plurality of final images outputted by the image outputting device 110. For example, the image disposition storing section 290 stores layout data including the position where the plurality of final images is outputted and the sizes thereof. Then, the image output controlling section 282 selects layout data to be outputted to the image outputting device 110 among layout data stored in the image disposition storing section 290 and outputs the images selected by the image selecting section 272 in accordance to the layout data.

The image-capturing-position storing section 216 stores image capturing position where the plurality of final images stored in the final image storing section 208 was captured. For example, the image-capturing-position storing section 216 stores latitude and longitude information of the image capturing position by correlating with the image ID. For example, the latitude and longitude information received from the GPS satellite at timing when an image is captured by an image capturing apparatus is tagged to the final image as tag information. The image-capturing-position storing section 216 may then store the latitude and longitude information of the image capturing position extracted from the tag information tagged to the final image received from the image capturing apparatus. Beside that, the image capturing position to be stored in the image-capturing-position storing section 216 may be image capturing position itself tagged to the final image as tag information.

The output position getting section 212 obtains output position that is position where the image outputting device 110 that is caused to output the plurality of final images by the image output controlling section 282 is installed. For example, the output position getting section 212 obtains latitude and longitude information from the GPS satellite at timing when the image output controlling section 282 instructs to output images. Beside that, the output position getting section 212 may obtain output position registered by the user 180 in advance. Then, the positional range setting section 214 sets a wider positional range when a difference between the output position obtained by the output position getting section 212 and the image capturing position of the final images stored in the final image storing section 208.

The image selecting section 272 also selects a plurality of final images captured within a preset positional range among the plurality of final images stored in the final image storing section 208. Specifically, the image selecting section 272 selects the plurality of final images captured within the positional range set by the positional range setting section 214. The image selecting section 272 also selects a plurality of final images captured within the preset time range and within the preset positional range among the plurality of final images stored in the final image storing section 208. For example, the image output controlling section 282 outputs the plurality of final images selected by the image selecting section 272 by disposing corresponding to the order of the image capturing time. It enables the image outputting apparatus 100 to provide images while disposing along a traveling route followed when the user 180 captured the images.

Then, the image output controlling section 282 outputs the plurality of final images selected by the image selecting section 272 by disposing corresponding to the image capturing position of the plurality of final images selected by the image selecting section 272. For example, the image output controlling section 282 disposes the final images in ascending or descending order of the latitude and/or longitude of the image capturing position.

The number-of-people detecting section 210 detects a number of persons included in each of the plurality of final images stored in the final image storing section 208. Then, the image output controlling section 282 outputs a final image including a largest number of persons detected by the number-of-people detecting section 210 at the center among the plurality of final images selected by the image selecting section 272.

The face image storing section 222 stores a face image of a personal subject by correlating with that personal subject. The face image storing section 222 also stores a face image of the appreciator by correlating with the appreciator who appreciates the final images stored in the final image storing section 208. The face image storing section 222 may also store a face image extracted out of an image of a person whose image was captured by the image capturing section 102. Beside them, the face image storing section 222 may store a face image of a person by extracting it out of an image area of the image stored in the final image storing section 208 and selected by the user 180. The face image storing section 222 may also store a face image extracted out of the final image. Specifically, the face image storing section 222 stores image data capturing a face of a person by correlating with a personal ID identifying a plurality of persons.

It is noted that the face image storing section 222 may store values of feature extracted out of a face image, instead of the face image itself. For example, the face image storing section 222 may store a shape of contours of a face, a shape of characteristic parts of face such as eyes, nose and mouth, position of each part in the whole face or a positional relationship between the respective parts.

The personal subject identifying section 226 identifies each person whose image was captured in the plurality of final images stored in the final image storing section 208. Specifically, the personal subject identifying section 226 identifies each personal subject in the plurality of final images stored in the final image storing section 208 by comparing the plurality of final images stored in the final image storing section 208 with the face image stored in the face image storing section 222. For example, the personal subject identifying section 226 extracts the value of feature of a face of a personal subject in the final image stored in the final image storing section 208 and identifies a personal ID of the personal subject by comparing the values of feature with values of feature of the face image stored in the face image storing section 222. It is noted that the final image storing section 208 may store a plurality of final images that are tagged with tag information for identifying a person such as a personal ID of a personal subject. Then, the personal subject identifying section 226 may identifies the personal subject based on the information for identifying a person tagged to each of the final images.

The image capturing section 102 obtains an image of the appreciator by capturing the image of the appreciator who appreciates the final images stored in the final image storing section 208. The appreciator identifying section 274 identifies the appreciator who appreciates the final images stored in the final image storing section 208. Specifically, the appreciator identifying section 274 identifies the appreciator who appreciates the final images stored in the final image storing section 208 by comparing the appreciator's image obtained by the image capturing section 102 with the face image stored in the face image storing section 222. For example, the appreciator identifying section 274 extracts the value of feature of the face of the appreciator from the image captured by the image capturing section 102 and compares it with the value of feature of the face image stored in the face image storing section 222 to identify the personal ID of the appreciator.

The recording section 104 stores records of voice of the appreciator appreciating the final images stored in the final image storing section 208. The appreciator's voice storing section 284 stores voice information of the appreciator by correlating with the appreciator appreciating the final images stored in the final image storing section 208. For example, the appreciator's voice storing section 284 stores voiceprint data of that person by correlating with the personal ID for identifying a plurality of persons.

The appreciator identifying section 274 identifies the appreciator appreciating the final images stored in the final image storing section 208 by comparing the voice recorded by the recording section 104 with the voice information stored by the appreciator's voice storing section 284. For example, the appreciator identifying section 274 identifies the ID of the appreciator by collating the voiceprint data extracted out of the voice recorded by the recording section 104 with the voice print data stored in the appreciator's voice storing section 284.

The appreciator position storing section 286 stores position of the appreciator by correlating with the appreciator appreciating the final images stored in the final image storing section 208. The appreciator identifying section 274 identifies the appreciator appreciating the final images stored in the final image storing section 208 by comparing the position detected by the output position getting section 212 with the position stored by the appreciator position storing section 286. For example, the appreciator position storing section 286 stores latitude and longitude information indicating a location where the appreciator uses the image outputting apparatus 100 such as a location where the appreciator lives by correlating with the personal ID for identifying the appreciator. Then, the appreciator identifying section 274 retrieves position of the appreciator which is closest to the output position detected by the output position getting section 212 and a distance between the position of the appreciator and the output position is equal to or less than a value set in advance among positions of the appreciator stored by the appreciator position storing section 286 to get the personal ID correlating with the position of the appreciator out of the appreciator position storing section 286.

The person-of-interest storing section 242 stores a person of interest whom the appreciator is interested in by correlating with the appreciator who is appreciating the final images stored in the final image storing section 208. The person-of-interest selecting section 244 selects the person of interest stored in the person-of-interest storing section 242 by correlating with the appreciator identified by the appreciator identifying section 274. For example, the person-of-interest storing section 242 stores a personal ID and that of a person of interest whom the person of that personal ID is interested in. Then, the person-of-interest selecting section 244 selects, out of the person-of-interest storing section 242, the personal ID of the person of interest stored in the person-of-interest storing section 242 by correlating with the personal ID of the appreciator identified by the appreciator identifying section 274.

The image selecting section 272 selects a final image having the personal subject identified by the personal subject identifying section 226 that the personal subject is the person of interest selected by the person-of-interest selecting section 244 among the plurality of final images stored in the final image storing section 208. For example, the image selecting section 272 selects the final image in which the personal ID of the person of interest selected by the person-of-interest selecting section 244 is contained as the personal ID of the personal subject identified by the personal subject identifying section 226.

Then, the image output controlling section 282 causes the image outputting device 110 to output the plurality of final images stored in the final image storing section 208 so that the final image selected by the image selecting section 272 is highlighted. Specifically, the image output controlling section 282 outputs the plurality of final images stored in the final image storing section 208 while disposing the final image selected by the image selecting section 272 at the center thereof. The image output controlling section 282 also causes the image outputting device 110 to output the plurality of final images stored in the final image storing section 208 at different areas while enlarging the final image selected by the image selecting section 272 more than the other final images. In this case, the image output controlling section 282 causes the image outputting device 110 to output the final image selected by the image selecting section 272 and the plurality of final images stored in the final image storing section 208 at different positions within one and same output area so that the appreciator can appreciate them at a time. For example, the image output controlling section 282 selects layout data in which the size of the image disposed at the center is larger than the size of the images disposed at its periphery out of the layout data stored in the image disposition storing section 290 to dispose the final image selected by the image selecting section 272 at the center. Therefore, the user 180 can easily appreciate an image in which the image of the person whom the user 180 is interested in is enlarged.

It is noted that when there is a plurality of final images in which the personal subject is the person of interest selected by the person-of-interest selecting section 244, the image selecting section 272 selects a final image in which the person of interest selected by the person-of-interest selecting section 244 is largest among the final images. Beside that, when there is a plurality of final images in which the personal subject is the person of interest selected by the person-of-interest selecting section 244, the image selecting section 272 selects a final image in which the person of interest selected by the person-of-interest selecting section 244 is located at the most center part within the final image. Thus, the image outputting apparatus 100 can automatically select the image in which the person whom the user 180 is interested in is in as the personal subject and can provide the user 180 with such image.

The subject image storing section 232 stores an image of a subject by correlating with the subject in the final image stored in the final image storing section 208. Specifically, the subject image storing section 232 stores subject images in which the subjects were captured by correlating with subject IDs identifying the plurality of subjects.

The subject voice storing section 252 stores voice information specifying a subject by correlating with the subject in the final image stored in the final image storing section 208. For example, the subject voice storing section 252 stores voice of a person explaining the subject, e.g., "panda" by correlating with the subject ID.

The subject identifying section 254 identifies the subject contained in the voice of the appreciator of the final image stored in the final image storing section 208 by comparing the voice recorded by the recording section 104 with the voice information stored in the subject voice storing section 252. For example, the subject identifying section 254 identifies the subject ID corresponding to the voice coincident with a degree of coincidence higher than a preset value by comparing at least a part of voice of the user 180 recorded by the recording section 104 with the voice of "panda" stored in the subject voice storing section 252.

The subject image extracting section 234 extracts the subject image stored in the subject image storing section 232 by correlating with the subject identified by the subject identifying section 254. Specifically, the subject image extracting section 234 gets, out of the subject image storing section 232, the image of the subject stored by the subject image storing section 232 by correlating with the subject ID identified by the subject identifying section 254.

The image output controlling section 282 causes the image outputting device 110 to output the final images stored in the final image storing section 208 so that an area image containing the subject image extracted by the subject image extracting section 234 out of the final images stored in the final image storing section 208 is highlighted. Specifically, the image output controlling section 282 causes the image outputting device 110 to output the final images stored in the final image storing section 208 by enlarging the area image containing the subject image extracted by the subject image extracting section 234 out of the final images stored in the final image storing section 208.

The image output controlling section 282 also causes the image outputting device 110 to output the plurality of final images stored in the final image storing section 208 at different areas of the image outputting device 110 so that the final image containing the subject image extracted by the subject image extracting section 234 out of the plurality of final images stored in the final image storing section 208 is disposed at the center. In this case, the image output controlling section 282 causes the image outputting device 110 to output the final image containing the subject image extracted by the subject image extracting section 234 and the plurality of final images stored in the final image storing section 208 at different positions within one and same output area so that the appreciator can appreciate them in a time. Specifically, the image output controlling section 282 disposes the final image containing the subject image extracted by the subject image extracting section 234 at the most center part of the image represented by the layout data selected out of the image disposition storing section 290.

The face image extracting section 224 extracts the face image stored by the face image storing section 222 by correlating with the appreciator identified by the appreciator identifying section 274. For example, the face image extracting section 224 gets the face image of the appreciator correlated with the personal ID identified by the appreciator identifying section 274 out of the face image storing section 222.

The image output controlling section 282 causes the image outputting device 110 to output the final images stored in the final image storing section 208 so that the area image containing the face image extracted by the face image extracting section 224 out of the final images stored in the final image storing section 208 is highlighted. The image output controlling section 282 causes the image outputting device 110 to output the final images stored in the final image storing section 208 so that the final image containing the face image extracted by the face image extracting section 224 out of the final images stored in the final image storing section 208 is enlarged.

The image output controlling section 282 also causes the image outputting device 110 to output the plurality of final images stored in the final image storing section 208 simultaneously at different areas thereof so that the final image containing the face image extracted by the face image extracting section 224 out of the plurality of final images stored in the final image storing section 208 is disposed at the center. Specifically, the image output controlling section 282 disposes the final image containing the face image extracted by the face image extracting section 224 is disposed at the most center part of the image represented by the layout data selected out of the image disposition storing section 290.

The image outputting apparatus 100 described above allows images which the user 180 wants to appreciate such as those of the appreciating user 180 oneself, of a person whom the user 180 is interested in and a subject which the user 180 is specifically interested in to be stored in an album. Then, the image outputting apparatus 100 can provide the user 180 with the album having the adequate layout by disposing such images at the center for example. Therefore, the user 180 can appreciate the images easily and pleasantly by using the image outputting apparatus 100.

Figure 3:
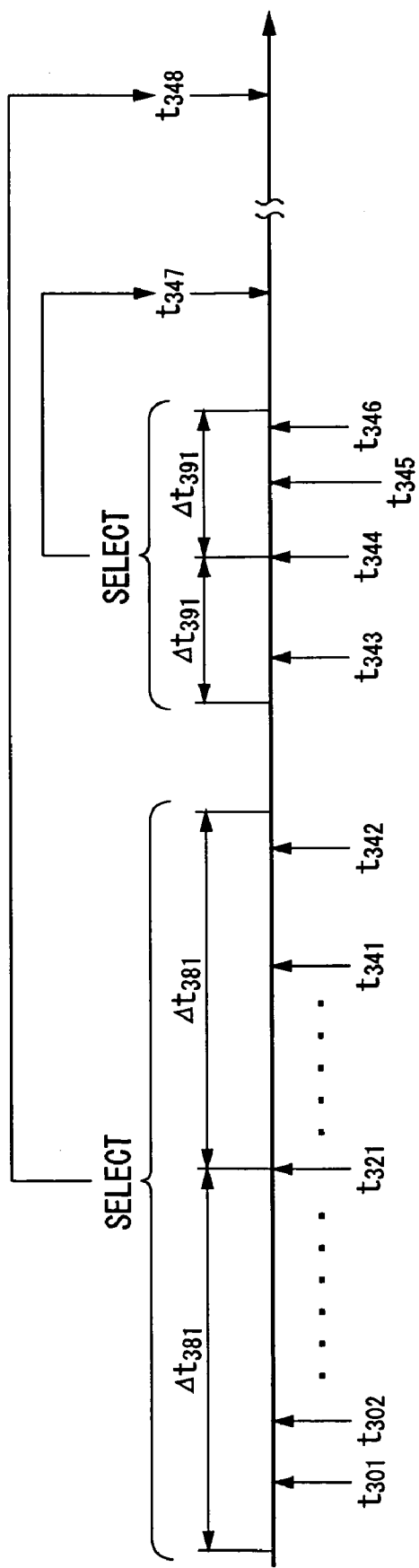
FIG. 3 is a chart showing a time range of image capturing time from which an image selecting section selects an image.

FIG. 3 is a chart showing one exemplary time range of image capturing time during which the image selecting section 272 selects images. In the example in FIG. 3, the final image storing section 208 stores images captured during image capturing time t301 through t346. It is noted that the image-capturing-time storing section 206 stores the image capturing time t301 through t346. Then, when the image outputting apparatus 100 receives an instruction to display the image captured at image capturing time t344, the time range setting section 204 sets time ranges Δt391 based on a time difference between the output time t347 obtained by the output time getting section 202 and the image capturing time t344. Then, the image selecting section 272 selects the images captured in a time range before and/or after the time range Δt391 from the image capturing time t344, e.g., the images captured during image capturing time t343 through t346.

Further, when the image outputting apparatus 100 receives an instruction to display the image captured at image capturing time t321 at output time t348 after the output time t347, the time range setting section 204 sets time ranges Δt381 longer than the time range Δt391 based on a time difference between the output time t348 obtained by the output time getting section 202 and the image capturing time t321. Then, the image selecting section 272 selects the images captured during a time range before and/or after the time range Δt381 from the image capturing time t321, e.g., the images captured during the image capturing time t301 through t342.

It is noted that the image outputting apparatus 100 may present the plurality of images to the user 180 so that the user 180 selects an image to be outputted. At this time, the time range setting section 204 may set the time range based on a time difference between the image capturing time at which the selected image was captured and the output time. Beside that, the image outputting apparatus 100 may enable the user 180 to input time and date on which a group of images to be outputted was captured. Then, the time range setting section 204 may set the time range based on a time difference between the time and date inputted by the user 180 and the output time. It is noted that the time range setting section 204 may set a value obtained by dividing the time difference between the output time and the image capturing time by a predetermined number as a time range out of which the image selecting section 272 should select images.

Figure 4:
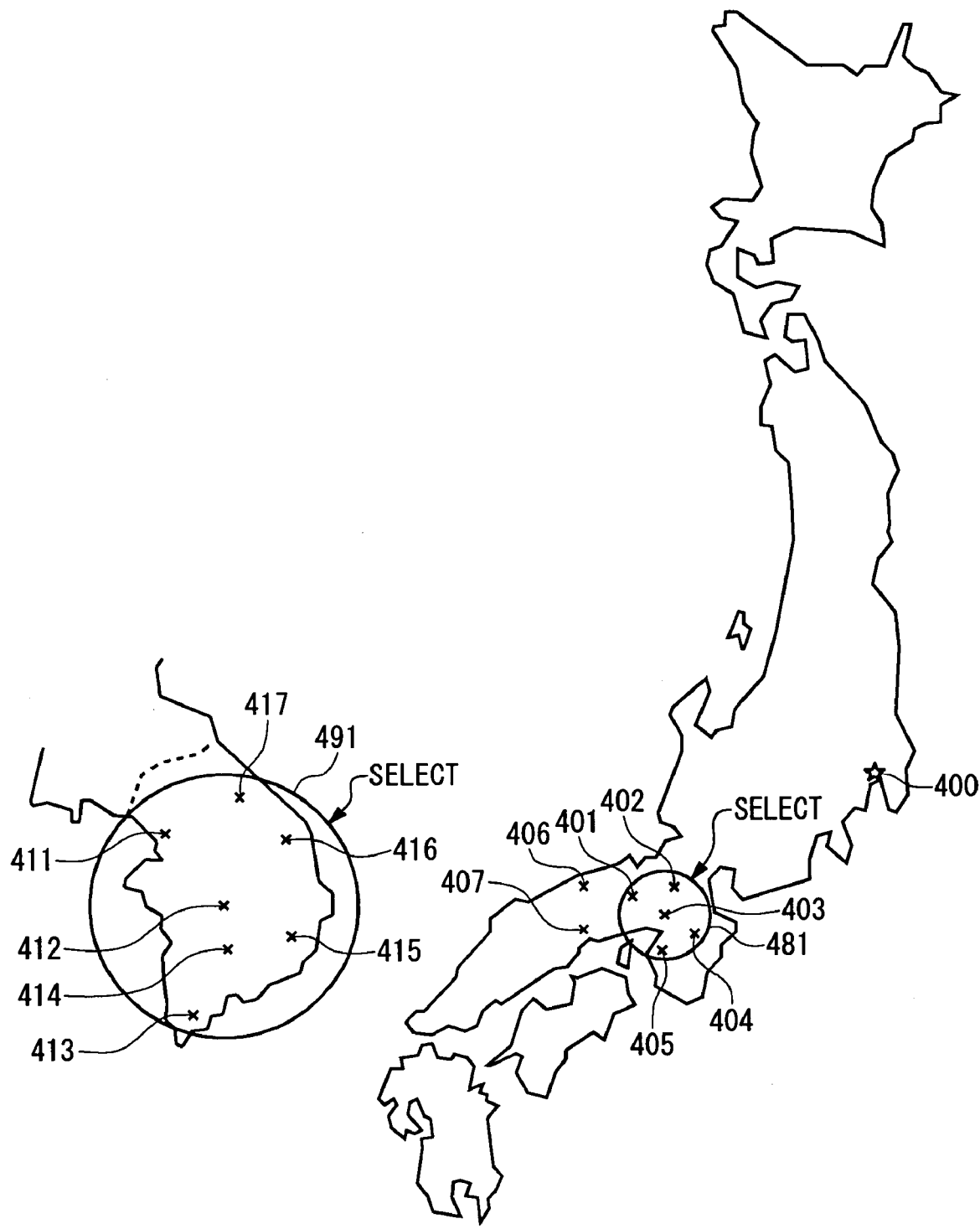
FIG. 4 is a drawing showing positional ranges of image capturing positions selected by the image selecting section.

FIG. 4 shows one exemplary positional range of image capturing position of an image selected by the image selecting section 272. In the example shown in FIG. 4, the image-capturing-position storing section 216 stores image capturing positions 401 through 407 in the Kinki districts in Japan and image capturing positions 411 through 417 in Korea. Then, when the user 180 instructs the image outputting apparatus 100 to display an image captured at the image capturing position 403 at an output position 400 in Tokyo where the user 180 lives, the positional range setting section 214 defines a positional range 481 containing a part of the Kinki districts based on a distance between the output position 400 obtained by the output position getting section 212 and the image capturing position 403. Then, the image selecting section 272 selects images captured within the positional range 481, i.e., the images captured at image capturing positions 401 through 405. It is noted that the positional range setting section 214 may set a range surrounded by a cycle having a radius of a value obtained by dividing a distance between the output position 400 and the image capturing position 403 by a predetermined number as the positional range 481.

Further, when the user 180 instructs the image outputting apparatus 100 to display an image captured at image capturing position 412 at the output position 400, the positional range setting section 214 defines a positional range 491 containing the whole area of Korea based on a distance between the output position obtained by the output position getting section 212 and the image capturing position 412. Then, the image selecting section 272 selects images captured within the positional range 491, i.e., images captured at image capturing positions 411 through 417. Therefore, the image outputting apparatus 100 provides the user 180 living in Tokyo with the images captured at part of the Kinki Districts centering on images captured in Kyoto in providing with an album centering on the images captured in Kyoto and provides the user 180 with the images captured in the whole area of Korea in creating an album out of the images captured in Korea distant from Tokyo. Thus, the image outputting apparatus 100 will not provide the user 180 who is living in Tokyo with a combination of images from which the user 180 would feel a sense of incompatibility by providing the images captured in Kyoto together with images captured in Tokyo in a time for example. Therefore, the user 180 can enjoy appreciating the images because the image outputting apparatus 100 can easily appreciate the images adequately selected by the image outputting apparatus 100.

It is noted that the image outputting apparatus 100 may present the plurality of images to the user 180 so that the user 180 selects the images to be outputted. At this time, the positional range setting section 214 may set the positional range based on a distance between the image capturing position where the selected image was captured and the output position. Beside that, the image outputting apparatus 100 may enable the user 180 to input image capturing position where the group of images that the user 180 wants to output was captured. Then, the positional range setting section 214 may set the positional range based on a distance between the inputted image capturing position and the output position.

FIG. 5 is a table showing one exemplary data stored in the person-of-interest storing section 242 in a table format. The person-of-interest storing section 242 stores personal IDs for identifying appreciators, personal IDs for identifying persons-of-interest whom the appreciator is interested in and degrees-of-interest indicating degrees of interest of the appreciator with respect to the persons-of-interest. For example, the person-of-interest storing section 242 stores data indicating that a person having a personal ID #501 is interested in a person having a personal ID #511 with a degree of interest of 10 for example. The person having the personal ID #501 is also interested in a person having a personal ID #512 with a degree of interest of 8 that is lower than that to the person having the personal ID #511.

Then, the person-of-interest selecting section 244 selects the personal ID of the person of interest stored in the person-of-interest storing section 242 by correlating with the personal ID of the appreciator identified by the appreciator identifying section 274. It is noted that the person-of-interest selecting section 244 may select personal IDs of a plurality of persons of interest for one appreciator.

Then, when personal ID of the person of interest selected by the person-of-interest selecting section 244 is included in the personal ID identified by the personal subject identifying section 226 as being a personal subject of the final image, the image selecting section 272 selects that final image. It is noted that the personal subject identifying section 226 may identify position of the image area containing the personal subject and the size of the image area. Then, the image selecting section 272 may select a final image in which the image area containing the person of interest as the personal subject is located at the most center part of the final image and in which that image area is largest. Thus, the image outputting apparatus 100 enables the user 180 to have the album or the like in which persons of high interest of the user 180 such as grand children or friends of the user 180 are largely seen at the center. Accordingly, the user 180 can appreciate the album or the like easily and pleasantly.

It is noted that when the person-of-interest selecting section 244 selects a plurality of personal IDs as person of interests, the image selecting section 272 may select a final image containing a largest number of person of interests. Still more, when the person-of-interest selecting section 244 selects a plurality of personal IDs having different degrees of interest as person of interests, the image selecting section 272 may select a final image containing a largest number of person of interests, an image area containing a person of interest having the highest degree of interest is located at the most center part in the final image and the size of the image area is largest.

FIG. 6 is a table showing one exemplary data stored in the subject image storing section 232 in a table format. The subject image storing section 232 stores subject IDs for identifying subjects and image data in which the subjects are captured. For example, the subject image storing section 232 stores image data of panda by correlating with a subject ID #601 identifying panda. It is noted that when the image capturing apparatus records a final image, it may record a subject image of the subject contained in the final image in the same time. Then, the subject image storing section 232 may receive the subject image from the image capturing apparatus.

FIG. 7 is a table showing one exemplary data stored in the subject voice storing section 252 in a table format. The subject voice storing section 252 stores a subject ID for identifying a subject and subject voice indicating the subject. When a subject identified by a subject ID #601 is panda, for example, the subject voice storing section 252 stores voice of "panda" spoken by people. It is noted that when the image capturing apparatus stores a final image, the image outputting apparatus 100 may record words indicating the subject and may cause the image capturing apparatus to store the voice together with the subject image. Then, the subject voice storing section 252 and the subject image storing section 232 may receive the voice and the subject image respectively from the image capturing apparatus to store them by correlating with the same subject ID.

It is noted that the subject voice storing section 252 may store a value of feature extracted out of voice, e.g., merkepstrum, instead of the voice data itself. Then, among values of feature of voices stored in the subject voice storing section 252, the subject identifying section 254 selects a voice ID having a value of feature coincident with the value of feature extracted out of the voice recorded by the recording section 104. Then, the subject image extracting section 234 selects subject image data stored in the subject image storing section 232 by correlating with the voice ID selected by the subject identifying section 254.

Figure 8:
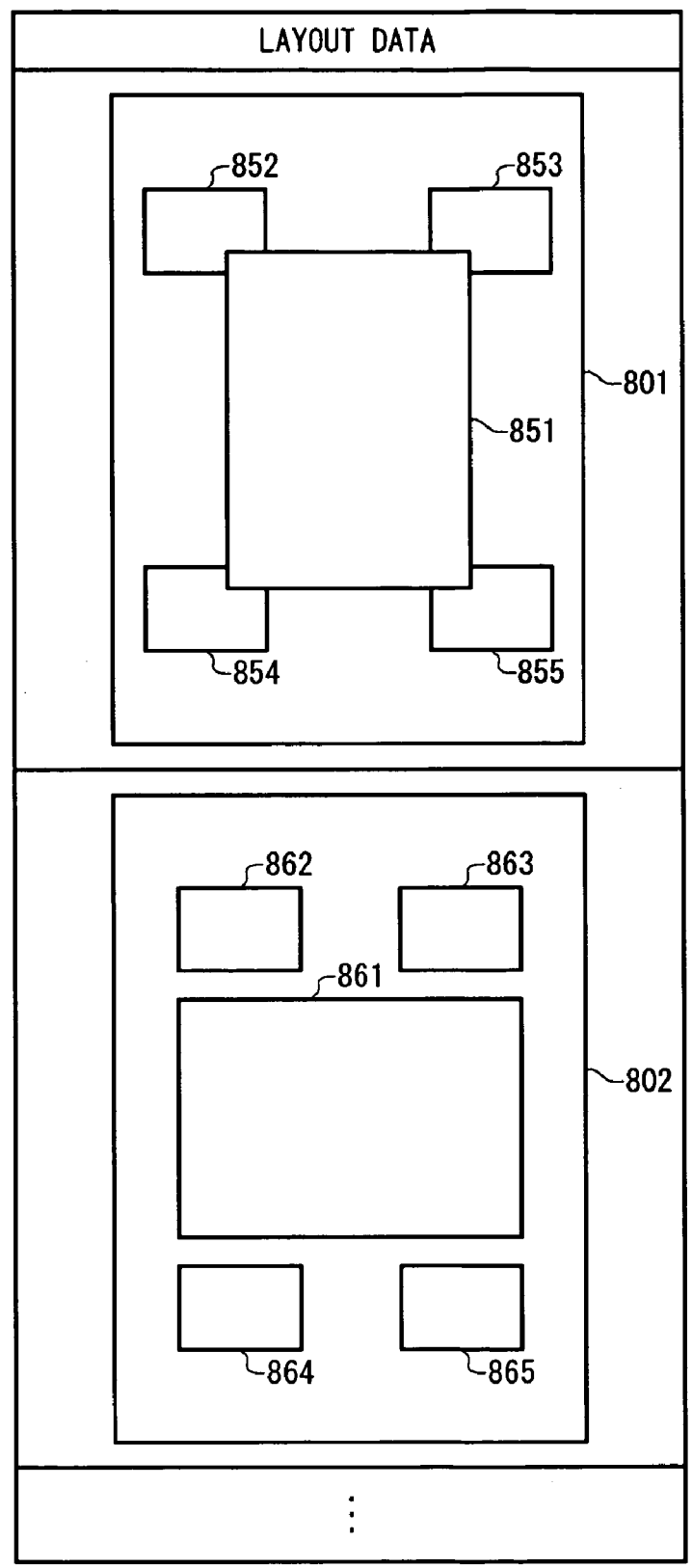
FIG. 8 is a table shoring data stored in an image disposition storing section.

FIG. 8 shows one exemplary data stored in the image disposition storing section 290. The image disposition storing section 290 stores layout data presenting a disposition of images. For example, the image disposition storing section 290 stores layout data containing a plurality of disposition data indicating position and size where a final image is disposed. In the example in FIG. 8, the image disposition storing section 290 stores layout data 801 containing disposition data 851 through 855 and layout data 802 containing disposition data 861 through 865. It is noted that the image disposition storing section 290 may store position of center of gravity of an image area as position where the final image is disposed. The image disposition storing section 290 may also store position and size where a final image is disposed by storing coordinates of two diagonal points of an outer periphery of a rectangle as disposition data for disposing the final image in rectangle.

Then, the image output controlling section 282 disposes the image selected by the image selecting section 272 based on the disposition data presented by the layout data and causes the image outputting device 110 to output them. It is noted that the image outputting apparatus 100 may present the plurality of layout data to the user 180 to enable the user 180 to select the layout data. Then, the image output controlling section 282 may cause the image outputting device 110 to output the images in accordance to the layout data selected by the user 180.

Figure 9:
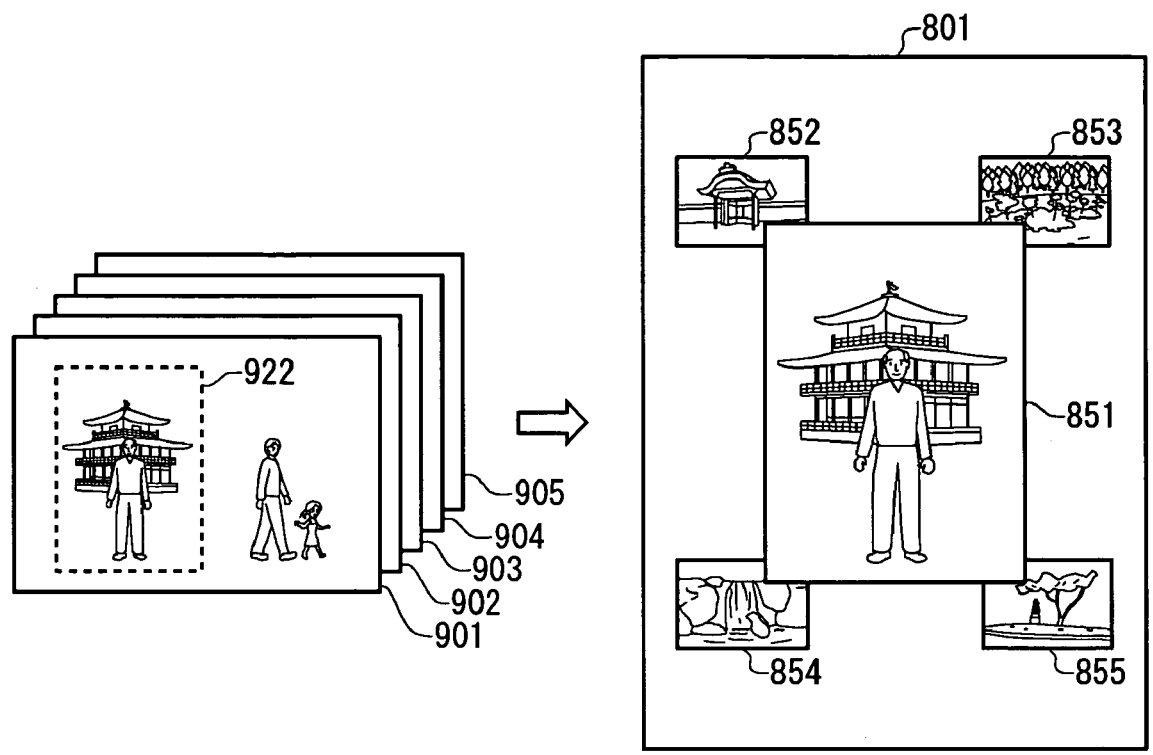
FIG. 9 is a drawing showing dispositions of final images disposed by an image output controlling section.
Figure 9:
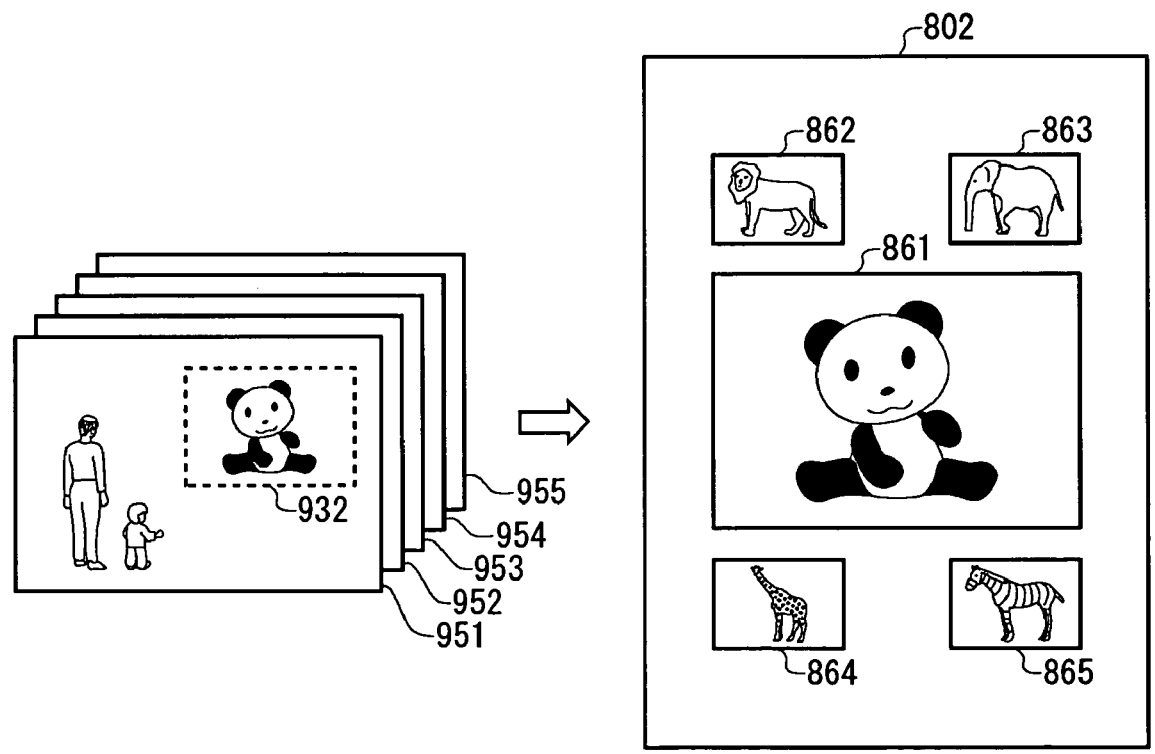

FIG. 9 shows one exemplary disposition of final images disposed by the image output controlling section 282. The image output controlling section 282 disposes final images 901 through 905 selected by the image selecting section 272 in accordance to the layout data 801. For example, the image output controlling section 282 extracts an image area 922 in which the whole body of the user 180 including the face image of the user 180 extracted by the face image extracting section 224 is captured. Then, the image output controlling section 282 disposes the image enlarged so that the image area falls within the range specified by the disposition data 851 at the position specified by the disposition data 851. Accordingly, the image outputting apparatus 100 can provide the user 180 with the album laid out so as to highlight the image in which the user 180, i.e., the appreciator, is captured. It is noted that 282 may dispose images whose image capturing time is older to the upper and left part of the screen. For example, the image output controlling section 282 may dispose the final images 902 through 905 in order of older image capturing time in the disposition data 852 through 855.

It is noted that the image output controlling section 282 may identify the image area in the final image 901 in which the face image of the user 180 is captured by extracting the contours of face of the user 180 and by comparing by means of pattern matching with the contours of the face image of the user 180 stored in the face image storing section 222 in identifying the image containing the face image of the user 180 out of the final images 901 through 905. At this time, the image output controlling section 282 may compare an image area containing a subject having a color close to that of human skin among subjects contained in the final image with the face image of the user 180. Then, the image output controlling section 282 may identify the image area in which a whole human body is captured by means of pattern matching of contours of a subject in an area including the image area containing the face image with a pattern of human body set in advance and may dispose that image area at the position 851.

Still more, when the user 180 makes voice including "panda" in appreciating the final images 951 through 955, the subject image extracting section 234 extracts an image of panda. Then, the image output controlling section 282 disposes final images 951 through 955 selected by the image selecting section 272 in accordance to the layout data 802. For example, the image output controlling section 282 extracts an image area 932 containing the image of panda extracted by the subject image extracting section 234. Then, the image output controlling section 282 disposes the image enlarged so that the image area falls within the range specified by the disposition data 861 at position and size specified by the disposition data 861. Thus, the image outputting apparatus 100 can extract the word specifying the subject from the voice made by the appreciator and can provide the user 180 with the highlighted image containing that subject. Therefore, the user 180 can appreciate the image of the subject, which the appreciator is interested in, by freely and easily highlighting the image.

It is noted that the image output controlling section 282 may dispose a final image containing a more number of people detected by the number-of-people detecting section 210 at the center position such as the disposition data 851 and 861. It enables the image outputting apparatus 100 to provide the user 180 with an image that would be an important reminiscence for the user 180 such as a collective photo on his journey. Still more, the image output controlling section 282 can provide the user 180 with an image in which a person of interest of the user 180 is highlighted by outputting the image of the person of interest of the user 180 selected by the image selecting section 272 in accordance to the disposition based on the disposition data 851 or 861 for example.

Figure 10:
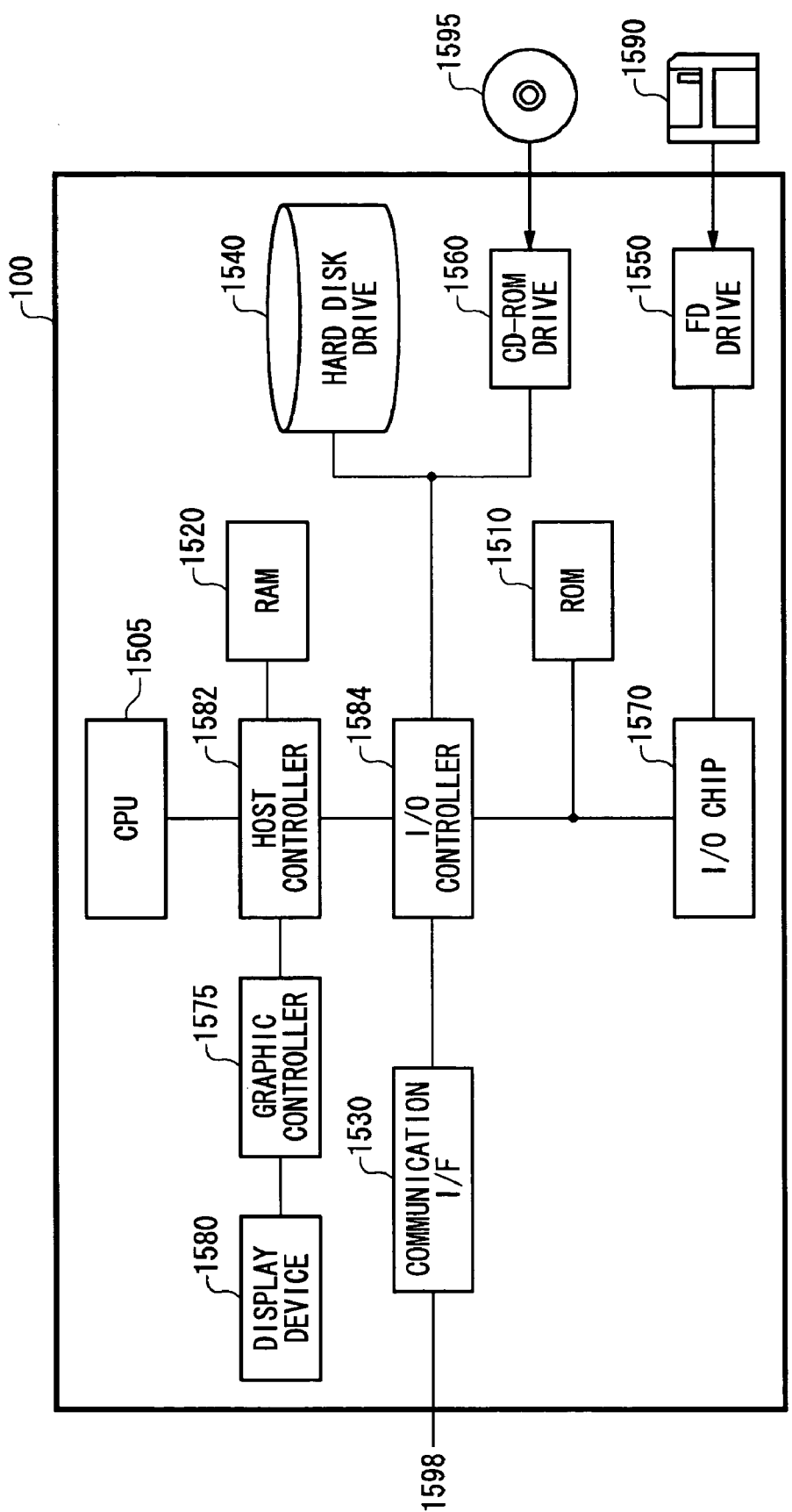
FIG. 10 is a diagram showing a hardware configuration of the image outputting apparatus.

FIG. 10 is a block diagram showing one exemplary hardware configuration of the image outputting apparatus 100 of the embodiment. The image outputting apparatus 100 of the present embodiment has a CPU peripheral section having a CPU 1505, a RAM 1520, a graphic controller 1575 and a display device 1580 mutually connected by a host controller 1582, an input/output section having a communication interface 1530, a hard disk drive 1540 and a CD-ROM drive 1560 connected with the host controller 1582 via an input/output controller 1584 and a legacy input/output section having a ROM 1510, a flexible disk drive 1550 and an input/output chip 1570 connected with the input/output controller 1584.

The host controller 1582 connects the RAM 1520, the CPU 1505 that accesses the RAM 1520 at high transfer rate and the graphic controller 1575. The CPU 1505 operates based on programs stored in the ROM 1510 and the RAM 1520 to control the respective sections. The graphic controller 1575 obtains image data generated by the CPU 1505 and others on a frame buffer provided within the RAM 1520 to display on the display device 1580. Instead of that, the graphic controller 1575 may contain the frame buffer for storing the image data generated by the CPU 1505 and others.

The input/output controller 1584 connects the host controller 1582 with the communication interface 1530, which is a relatively fast input/output device, the hard disk drive 1540 and the CD-ROM, drive 1560. The hard disk drive 1540 stores programs and data used by the CPU 1505. The communication interface 1530 communicates with a network communication system 1598 to send/receive programs or data. The CD-ROM drive 1560 reads the program or data out of the CD-ROM 1595 and provides it to the hard disk drive 1540 and to the communication interface 1530 via the RAM 1520.

The input/output controller 1584 is connected with the relatively slow input/output devices of the ROM 1510, the flexible disk drive 1550 and the input/output chip 1570. The ROM 1510 stores a boot program executed by the image outputting apparatus 100 in starting the system and programs and the like dependent on the hardware of the image outputting apparatus 100. The flexible disk drive 1550 reads a program or data out of a flexible disk 1590 and provides it to the hard disk drive 1540 and to the communication interface 1530 via the RAM 1520. The input/output chip 1570 connects the flexible disk drive 1550 and the various input/output devices via parallel ports, serial ports, keyboard ports, mouse ports and the like.

The program executed by the CPU 1505 is stored in the flexible disk 1590, the CD-ROM 1595 or the recording medium such as an IC card to be provided to the user. The program stored in the recording medium may be compressed or non-compressed. The program is installed out of the recording medium to the hard disk drive 1540 and is read to the RAM 1520 to be executed by the CPU 1505.

The program executed by the CPU 1505 causes the image outputting apparatus 100 to function as the output time getting section 202, the image-capturing-time storing section 206, the image-capturing-position storing section 216, the time range setting section 204, the recording section 104, the positional range setting section 214, the output position getting section 212, the final image storing section 208, the image selecting section 272, the image output controlling section 282, the image outputting device 110, the subject image extracting section 234, the subject image storing section 232, the subject identifying section 254, the subject voice storing section 252, the face image extracting section 224, the person-of-interest storing section 242, the person-of-interest selecting section 244, the personal subject identifying section 226, the face image storing section 222, the appreciator identifying section 274, the image capturing section 102, the appreciator position storing section 286, the appreciator's voice storing section 284, the recording section 104, the number-of-people detecting section 210 and the image disposition storing section 290.

The program described above may be stored in an outside recording medium. Beside the flexible disk 1590 and the CD-ROM 1595, an optical recording medium such as DVD and PD, a taped medium, and a semiconductor memory such as an IC card may be used as the recording medium. Still more, a hard disk provided in a server system connected with a private communication network or Internet, or a storage unit such as a RAM may be used as the recording medium and the program may be provided to the computer 1500 via the network.

Although the invention has been described by way of the exemplary embodiments, it should be understood that those skilled in the art might make many changes and substitutions without departing from the spirit and scope of the invention.

It is obvious from the definition of the appended claims that the embodiments with such modifications also belong to the scope of the invention.

What is claimed is:

1. An image outputting apparatus comprising:
   a final image storing section for storing a plurality of final images;
   an image-capturing-time storing section for storing image capturing time when each of the plurality of final images stored in said final image storing section was captured;
   an image selecting section for selecting a plurality of final images captured within a preset time range among the plurality of final images stored in said final image storing section;
   an image output controlling section for outputting the plurality of final images selected by said image selecting section at different positions within one and same output area;
   an output time getting section for getting output time when the plurality of final images stored in said final image storing section is required to be outputted; and
   a time range setting section for setting a wider time range when a difference between the output time obtained by said output time getting section and the image capturing time of the final image stored in said final image storing section is longer; wherein
   said image selecting section selects the plurality of final images captured within the time range set by said time range setting section.

2. The image outputting apparatus as set forth in claim 1, wherein
   said image output controlling section outputs the plurality of final images selected by said image selecting section by disposing corresponding to order of the image capturing time of the plurality of final images.

3. An image outputting apparatus comprising:
   a final image storing section for storing a plurality of final images;
   an image-capturing-time storing section for storing image capturing time when each of the plurality of final images stored in said final image storing section was captured;
   an image selecting section for selecting a plurality of final images captured within a preset time range among the plurality of final images stored in said final image storing section;
   an image output controlling section for outputting the plurality of final images selected by said image selecting section at different positions within one and same output area; and
   an image-capturing-position storing section for storing image capturing position where each of the plurality of final images stored in said final image storing section was captured; wherein
   said image selecting section selects a plurality of final images captured within a positional range set in advance within a time range set in advance among the plurality of final images stored in said final image storing section.

4. The image outputting apparatus as set forth in claim 3, further comprising:
   an output position getting section for getting output position which is the position where an image outputting device for outputting the plurality of final images under control of said image output controlling section is installed; and
   a positional range setting section for setting a wider positional range when a difference of position between the output position obtained by said output position getting section and the image capturing position of the final image stored in said final image storing section is larger; wherein
   said image selecting section selects a plurality of final images captured within the positional range set by said positional range setting section.

5. The image outputting apparatus as set forth in claim 3, wherein
   said image output controlling section outputs the plurality of final images selected by said image selecting section by disposing corresponding to image capturing position of the plurality of final images.

6. The image outputting apparatus as set forth in claim 3, wherein said image output controlling section outputs the plurality of final images selected by said image selecting section by disposing corresponding to order of the image capturing time of the plurality of final images.

7. An image outputting apparatus comprising:
   a final image storing section for storing a plurality of final images;
   an image-capturing-time storing section for storing image capturing time when each of the plurality of final images stored in said final image storing section was captured;

an image selecting section for selecting a plurality of final images captured within a preset time range among the plurality of final images stored in said final image storing section;

an image output controlling section for outputting the plurality of final images selected by said image selecting section at different positions within one and same output area; and a number-of-people detecting section for detecting a number of people contained in each of the plurality of final images stored in said final image storing section; wherein said image output controlling section outputs a final image containing a largest number of people detected by said number-of-people detecting section at the center among the plurality of final images selected by said image selecting section.

8. The image outputting apparatus as set forth in claim 7, wherein said image output controlling section outputs the plurality of final images selected by said image selecting section by disposing corresponding to order of the image capturing time of the plurality of final images.

9. An image outputting method, comprising:
a final image storing step of storing a plurality of final images;
an image-capturing-time storing step of storing image capturing time when each of the plurality of final images stored in said final image storing step was captured;
an image selecting step of selecting a plurality of final images captured within a preset time range among the plurality of final images stored in said final image storing step;
an image output controlling step of outputting the plurality of final images selected in said is storing step at different positions within one and same output area;
an output time getting step for getting an output time when the plurality of final images stored in said final image storing section is required to be outputted; and
a time range setting step for setting a wider time range when a difference between the output time obtained by said output time getting step and the image capturing time of the final image stored in said final image storing step is longer; wherein
said image selecting step selects the plurality of final images captured within the preset time range.

10. A non-transitory computer readable medium having stored thereon a program for use in an image outputting apparatus for outputting images, operating said image outputting apparatus by performing the steps of:
storing in a final image storing section a plurality of final images;
storing image capturing time when each of the plurality of final images stored in said final image storing section was captured;
selecting a plurality of final images captured within a preset time range among the plurality of final images stored in said final image storing section;
outputting the plurality of final images selected by said image selecting section at different positions within one and same output area;
getting an output time when the plurality of final images stored in said final image storing section is required to be outputted; and
setting a wider time range when a difference between the output time and the image capturing time of the final image stored in said final image storing section is longer; wherein the plurality of final images captured are selected within the preset time range.

11. An image outputting method, comprising:
a final image storing step of storing a plurality of final images;
an image-capturing-time storing step of storing image capturing time when each of the plurality of final images stored in said final image storing step was captured;
an image selecting step of selecting a plurality of final images captured within a preset time range among the plurality of final images stored in said final image storing step;
an image output controlling step of outputting the plurality of final images selected in said is storing step at different positions within one and same output area;
an image-capturing-position storing step for storing image capturing position where each of the plurality of final images stored in said final image storing step was captured; wherein
said image selecting step selects a plurality of final images captured within a positional range set in advance within a time range set in advance among the plurality of final images stored in said final image storing step.

12. An image outputting method, comprising:
a final image storing step of storing a plurality of final images;
an image-capturing-time storing step of storing image capturing time when each of the plurality of final images stored in said final image storing step was captured;
an image selecting step of selecting a plurality of final images captured within a preset time range among the plurality of final images stored in said final image storing step;
an image output controlling step of outputting the plurality of final images selected in said is storing step at different positions within one and same output area;
a number-of-people detecting step for detecting a number of people contained in each of the plurality of final images stored in said final image storing section; wherein
said image output controlling step outputs a final image containing a largest number of people detected by said number-of-people detecting step at the center among the plurality of final images selected by said image selecting step.

13. A non-transitory computer readable medium having stored thereon a program for use in an image outputting apparatus for outputting images, operating said image outputting apparatus by performing the steps of:
storing in a final image storing section a plurality of final images;
storing image capturing time when each of the plurality of final images stored in said final image storing section was captured;
selecting a plurality of final images captured within a preset time range among the plurality of final images stored in said final image storing section;
outputting the plurality of final images selected at different positions within one and same output area; and
storing image capturing positions where each of the plurality of final images stored in said final image storing section was captured; wherein
said image selecting step selects a plurality of final images captured within a positional range set in advance within said preset time range set in advance among the plurality of final images stored in said final image storing step.

14. A non-transitory computer readable medium having stored thereon a program for use in an image outputting apparatus for outputting images, operating said image outputting apparatus by performing the steps of:

storing in a final image storing section a plurality of final images;

storing image capturing time when each of the plurality of final images stored in said final image storing section was captured;

selecting a plurality of final images captured within a preset time range among the plurality of final images stored in said final image storing section;

outputting the plurality of final images selected by said image selecting section at different positions within one and same output area;

detecting a number of people contained in each of the plurality of final images stored in said final image storing section; wherein said outputting step outputs said final image containing a largest number of people detected at the center among the plurality of final images selected.

* * * * *